US008615488B2

(12) United States Patent  
Akulavenkatavara et al.

(10) Patent No.: US 8,615,488 B2  
(45) Date of Patent: Dec. 24, 2013

(54) PHYSICAL REPLICATION OF DATABASE SUBSET TO IMPROVE AVAILABILITY AND REDUCE RESOURCE COST IN A CLOUD ENVIRONMENT

(75) Inventors: Prasadarao Akulavenkatavara, Portland, OR (US); Gary Nanhao Jin, Portland, OR (US); Steven Robert Pearson, Portland, OR (US)

(73) Assignee: International Business Machines Corporation, Armonk, NY (US)

(*) Notice: Subject to any disclaimer, the term of this patent is extended or adjusted under 35 U.S.C. 154(b) by 55 days.

(21) Appl. No.: 13/174,987

(22) Filed: Jul. 1, 2011

(65) Prior Publication Data

US 2013/0006932 A1  Jan. 3, 2013

(51) Int. Cl.  
*G06F 7/00* (2006.01)  
*G06F 17/00* (2006.01)

(52) U.S. Cl.  
USPC ............................ 707/623; 707/655; 707/682

(58) Field of Classification Search  
USPC .................. 707/623, 626–628, 633, 655, 682  
See application file for complete search history.

(56) References Cited

U.S. PATENT DOCUMENTS

| 5,758,337 | A  | * | 5/1998  | Hammond ........................... 1/1 |
| 6,397,125 | B1 | * | 5/2002  | Goldring et al. ............... 700/200 |
| 6,697,805 | B1 | * | 2/2004  | Choquier et al. .............. 707/610 |
| 7,076,685 | B2 |   | 7/2006  | Pillai et al. .................... 714/6.31 |
| 7,346,633 | B2 | * | 3/2008  | Shang et al. ........................... 1/1 |
| 2007/0255763 | A1 |   | 11/2007 | Beyerle et al. ................. 707/201 |
| 2008/0082592 | A1 | * | 4/2008  | Ahal et al. ..................... 707/204 |
| 2009/0083443 | A1 |   | 3/2009  | Ocko et al. ..................... 709/248 |
| 2010/0180146 | A1 |   | 7/2010  | Rousseau et al. .................. 714/2 |
| 2010/0332629 | A1 |   | 12/2010 | Cotugno et al. ............... 709/221 |
| 2012/0166390 | A1 | * | 6/2012  | Merriman et al. ............. 707/613 |

OTHER PUBLICATIONS

Kemme, B. Database Replication for Clusters of Workstations. Dissertation. 2000 (PhD), Diss. ETH No. 13864, ETH Zürich, Department of Computer Science.*  
Gao et al., "Improving Availability and Performance with Application-Specific Data Replication,"IEEE Transactions on Knowledge and Data Engineering, vol. 17, No. 1, Jan. 2005, 15 pages.  
Bhushan et al., "High Availability in Websphere Messaging Solutions," IBM Redbooks, International Business Machines Corporation, 2010, 268 pages.  
"SaaS alternatives to on-premise email reduce costs, improve availability, and deliver a better user experience," Cisco White Paper, Cisco Systems, 2010, 9 pages.  
"Database rebuild," International Business Machines Corporation, Oct. 2006, 4 pages.

* cited by examiner

*Primary Examiner* — James E Richardson  
(74) *Attorney, Agent, or Firm* — VanLeeuwen & VanLeeuwen; Diana R. Gerhardt

(57) ABSTRACT

An approach is provided in which a standby component receives a database log record that corresponds to a modification to one of a primary database's corresponding physical storage spaces. The standby component determines whether a modified object associated with the database log record corresponds to a standby database, which includes a replication of a subset of the primary database's corresponding physical storage spaces. When the standby component determines that the modified object corresponds to the standby database, the standby component invokes a physical replay that replicates the modification on the standby database.

13 Claims, 9 Drawing Sheets

Catalog
145

| TABLE ID | SCHEMA | TABLE NAME | STORAGE SPACE ID |
|---|---|---|---|
| 1 | Finance | T1 | 1 |
| 2 | Finance | T2 | 2 |
| 3 | Accounting | TA | 3 |
| 4 | Accounting | TB | 3 |
| 5 | Finance | T3 | 4 |

200 ⟋  205 ⟋  210 ⟋  215 ⟋

| INDEX ID | INDEX NAME | TABLE ID | STORAGE SPACE ID |
|---|---|---|---|
| 100 | IndexOnTableT3 | 5 | 10 |
| 200 | IndexOnTableTA | 4 | 20 |

DATABASE LOG RECORD

| Field | Value |
|---|---|
| Transaction ID | 123456 |
| Table ID | 5 |
| Storage Space | 4 |
| Page | 27 |
| Change Offset | 19E |
| Change Length | 2 |
| New Value | 35D |
| Old Value | 13A |
| ... | ... |

245 — Table ID
250 — Storage Space
255 — Page
260 — Change Offset
265 — Change Length
270 — New Value
275 — Old Value

FIG. 2B

PHYSICAL REPLICATION OF DATABASE SUBSET TO IMPROVE AVAILABILITY AND REDUCE RESOURCE COST IN A CLOUD ENVIRONMENT

BACKGROUND

The present disclosure relates to replicating a subset of a primary database's corresponding physical storage spaces on a standby database. More particularly, the present disclosure relates to a standby component receiving primary database log records, and applying the relevant database log records through physical replication to the standby database.

Current database deployments may consolidate servers into a virtualized, or "cloud" environment, in order to improve information technology (IT) support cost structure. As such, enterprises may include multiple small databases arrayed on various systems and consolidate them onto one larger virtualized system in order to gain economies and better return on investment. The enterprises may partition the larger databases over multiple physical storage spaces, which are segmented based upon schema or other attributes such as size or data type. Some of the partitions may require replication for reasons such as availability and/or disaster recovery, while other partitions may have less stringent recovery requirements.

BRIEF SUMMARY

According to one embodiment of the present disclosure, an approach is provided in which a standby component receives a database log record that corresponds to a modification to one of a primary database's corresponding physical storage spaces. The standby component determines whether a modified object associated with the database log record corresponds to a standby database, which includes a replication of a subset of the primary database's corresponding physical storage spaces. When the standby component determines that the modified object corresponds to the standby database, the standby component invokes a physical replay that replicates the modification on the standby database.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 2A is an exemplary diagram showing one embodiment of a catalog that includes information that associates objects (e.g., tables) with corresponding physical storage spaces;

FIG. 2B is an exemplary diagram showing a database log record that the primary component sends to the standby component when the primary component modifies the primary database;

DETAILED DESCRIPTION

Figure 1:
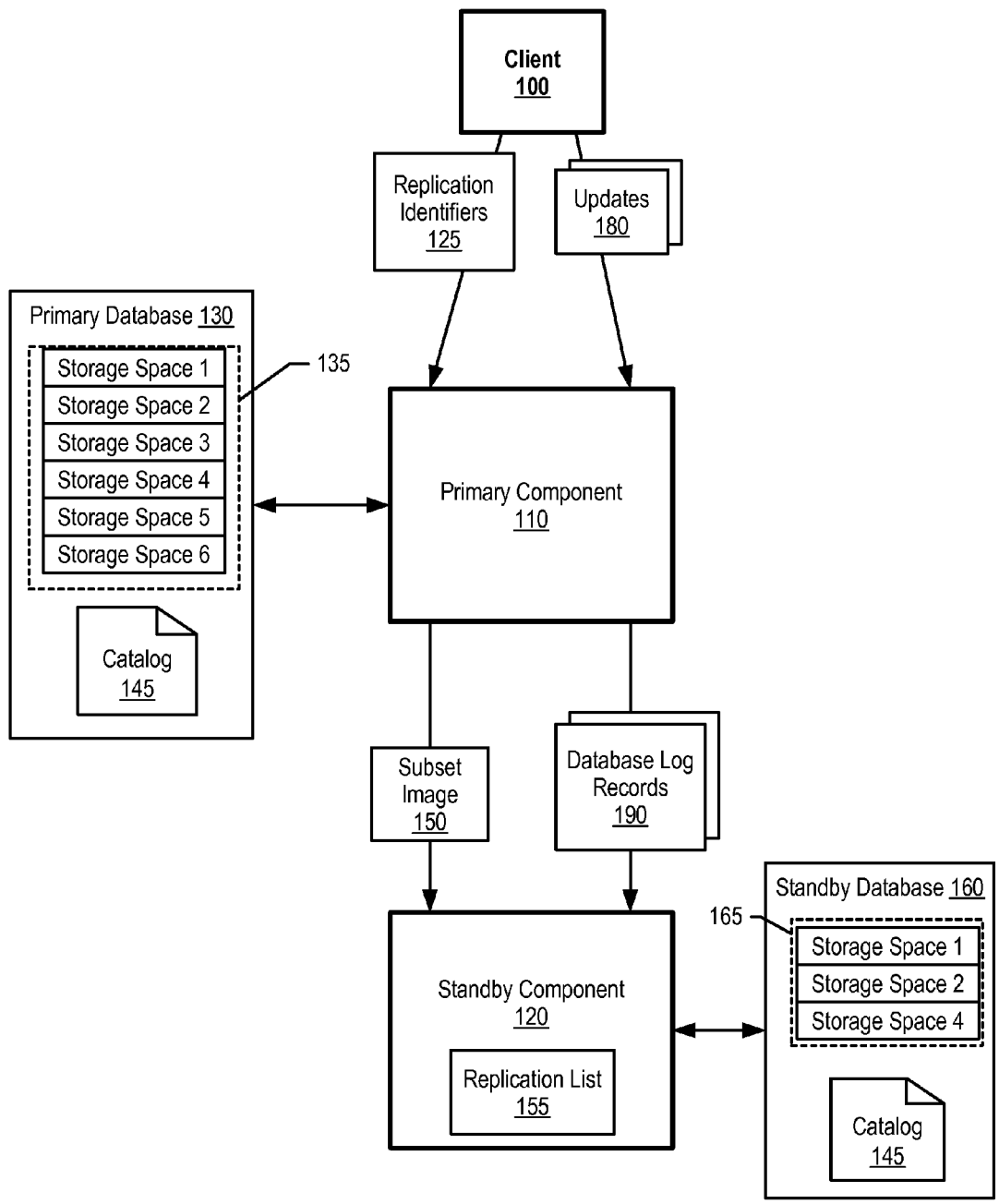
FIG. 1 is an exemplary diagram showing a standby component receiving a subset of physical storage spaces from a primary component and applying database log records to the subset of physical storage spaces.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device, such as, for example, an electrical connection having one or more wires or an optical fiber.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is an exemplary diagram showing a standby component receiving a subset image from a primary component and subsequent database log records. A user, such as a database administrator, uses client 100 to manage primary database 130's database replication. Primary component 110 stores primary database 130 on physical storages spaces 135, which may be partitioned based upon schema (e.g., finance, sales, etc.) or other attributes such as size, data type, and etcetera. Primary database 130 also includes catalog 145, which includes information pertaining to each of physical storage spaces 135 (see FIG. 2A and corresponding text for further details).

The database administrator identifies which data included in primary database 130 requires replication, such as for disaster recovery purposes or importance level. In turn, the database administrator instructs client 100 to send replication identifiers 125 to primary component 110. Replication identifiers may include logical information such as schema names (e.g., "all finance tables") or object names (e.g., "table 4") that identify data to replicate. Primary component 110 may be, for example, a processor, a thread executing on a processor, a client system, a server system, or another electronic component that is capable of managing primary database 130.

Primary component 110 receives replication identifiers 125 and utilizes catalog 145 to identify corresponding database objects, along with dependent objects that correspond to the identified database objects. For example, replication identifiers 125 may include a "finance" schema and, in turn, primary component 110 utilizes catalog 145 to identify tables (database objects) corresponding to the finance schema. As such, primary component 110 identifies dependent objects, such as indexes, that correspond to the finance tables (see FIG. 2A and corresponding text for further details).

Primary component 110 identifies one or more of physical storage spaces 135 that store the identified database objects (e.g., tables) and dependent objects (e.g., indexes, catalog tables). From this identified "subset" of physical storage spaces, primary component 110 creates subset image 150 and sends subset image 150 to standby component 120. Standby component 120 may be, for example, a processor, a thread executing on a processor, a client system, a server system, or another electronic component that is capable of managing standby database 160. Primary component 110 and standby component 120 may be co-located, or reside at different locations.

Standby component 120 restores subset image 150 and creates standby database 160, which includes a replication of a subset of physical storage spaces 135 (replicated physical storage space subset 165). In one embodiment, subset image 150 includes catalog 145, which standby component restores in standby database 145 for use in situations such as users accessing standby data, failovers, and database role switching. In another embodiment, standby component 120 generates replication list 155, which may include a list of replicated physical storage space subset 165, a list of replicated database objects and replicated dependent objects, and each of the catalog storage spaces. This enables standby component 120 to identify which updates on primary database 130 are relevant to standby database 160 (see FIGS. 4-5 and corresponding text for further details).

Client 100 sends updates 180 to primary component 110 that instruct primary component 110 to update data included in primary database 130. Primary component 110 processes updates 180, which includes modifying data in physical storage spaces 135 and generating database log records 190 that log the database changes. Database log records 190 include attributes that describe changes that primary component 110 perform on primary database 130, such as which storage space, database object, and bits that primary component 110 modifies (see FIG. 2B and corresponding text for further details). One of the attributes included in database log records 190 is a "modified physical storage space identifier" that identifies which one of the physical storage spaces that primary component 110 modified (e.g., "storage space 5").

As standby component 120 receives database log records 190, standby component 120 identifies physical storage spaces that correspond to database log records 190. For example, one of database log records may include information that identifies an update to "table 4" included in "storage space 5." Standby component 120 uses replication list 155 to determine, on an individual basis, which of database log records 190 is applicable to standby database 160 (e.g., whether standby database 160 includes a replication of the storage space that primary component 110 modified in primary database 130). If so, standby component 120 applies changes to standby database 160 according to the information included in database log records 190 (e.g., updates table 4 in storage space 5, see FIG. 5 and corresponding text for further details).

In one embodiment, primary component 110 filters database log records 190 and only ships database log records that pertain to standby database 160. In this embodiment, standby component 120 may apply each database log record that it receives without having to perform its own filtering operation.

FIG. 2A is an exemplary diagram showing one embodiment of a catalog that includes information that associates objects (e.g., tables) with corresponding physical storage spaces. Column 200 includes table identifiers that identify particular tables that are included in particular storage spaces shown in column 215. Columns 205 and 210 include schema and table names, respectively, that correspond to the table identifiers. In one embodiment, a primary component matches replication identifiers it receives from a client with the schema and/or table names included in columns 205-210 in order to identify storage spaces (column 215) to include in the subset of physical storage spaces. For example, the replication identifier may include a "Finance" schema and the primary component determines, based on catalog 145, to include storage spaces 1, 2, and 4 in the subset of physical storage spaces.

Catalog 145 also includes columns 220-235, which the primary component utilizes to identify dependent objects and their corresponding storage spaces to include in a subset image. Column 225 includes objects that are dependent upon particular tables. For example, the entry "IndexOnTableT3" is a dependent object of table T3. Column 230 includes a list of table identifiers that correspond to the dependent object that column 225's entries reference. Column 235 includes a list of storage space identifiers that store the dependent objects referenced in column 225. Continuing with the example discussed above, the primary component identified table identifiers 1, 2, and 5 as part of the subset of physical storage spaces and, since IndexOnTableT5 is a dependent object of table 5, then the primary component also includes storage space 10 (location of IndexOnTableT5) as part of the subset of images.

FIG. 2B is an exemplary diagram showing an example of a database log record that the primary component sends to the standby component when the primary component modifies the primary database. Database log record 240 includes field 245, which includes a modified database object identifier corresponding to the primary database's modified database object (e.g., table "5"). Database log record 240 also includes field 250, which includes a modified physical storage space identifier corresponding to the primary database's modified physical storage space (e.g., storage space "4").

Fields 255 and 260 include bit location information pertaining to a starting bit location within the primary database's database object where particular bits are modified. As such, the standby component may utilize these values as a modified bit location identifier (e.g., "page 27" with an offset of "19E"). Field 265 includes information as to number of bits that are changed, and fields 270-275 include new bit values and old bit values, respectively.

Figure 3:
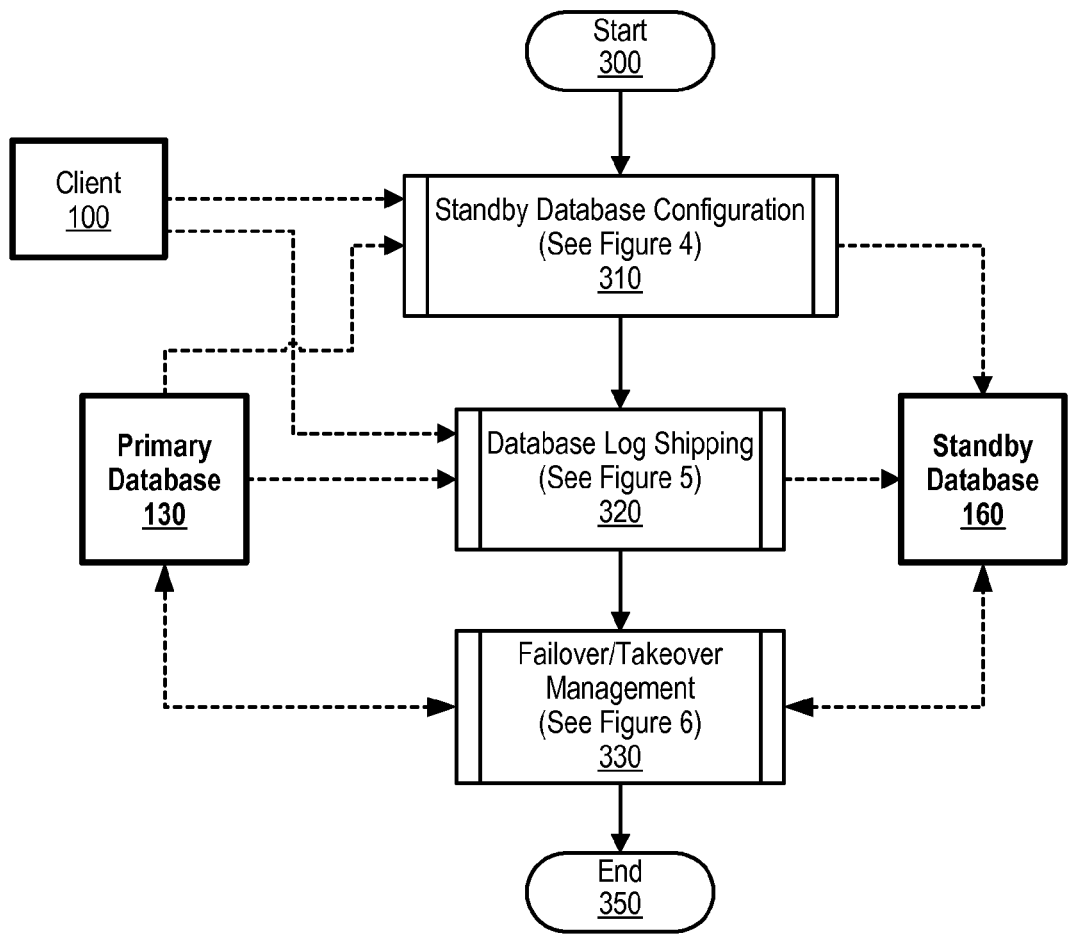
FIG. 3 is an exemplary flowchart showing steps that a primary component and standby component perform to create a subset image and update the subset image based upon database log records.

FIG. 3 is an exemplary flowchart showing steps that a primary component and standby component perform to create a subset image and update the subset image based upon database log records. Processing commences at step 300, whereupon client 100 sends one or more replication identifiers to the primary component, which the primary component utilizes to identify a subset of physical storage spaces included in primary database 130. In turn, the primary component sends a subset image to the standby component that the standby component restores as standby database 160, includes a replication of a subset of primary database 130's physical storage spaces (pre-defined process block 310, see FIG. 4 and corresponding text for further details).

At pre-defined process block 320, client 100 instructs the primary component to modify one of the objects in the primary database. The primary component identifies the physical storage space corresponding to the object, modifies the physical storage space, and generates a database log record to indicate the modification. In turn, the primary component sends the database log record to the standby component. The standby component determines which database log records pertain to the standby database 160, and updates standby database 160 accordingly (see FIG. 5 and corresponding text for further details). In one embodiment, the primary component determines whether the database log record corresponds to standby database 160 and sends just the corresponding database log records to the standby component.

At pre-defined process block 330, the primary component may experience a failure (or role switch request). At this point, standby database 160 becomes the new primary database and primary database 130 becomes the new standby database until a system administrator, for example, resolves any database issues (see FIG. 6 and corresponding text for further details). Processing ends at 350.

Figure 4:
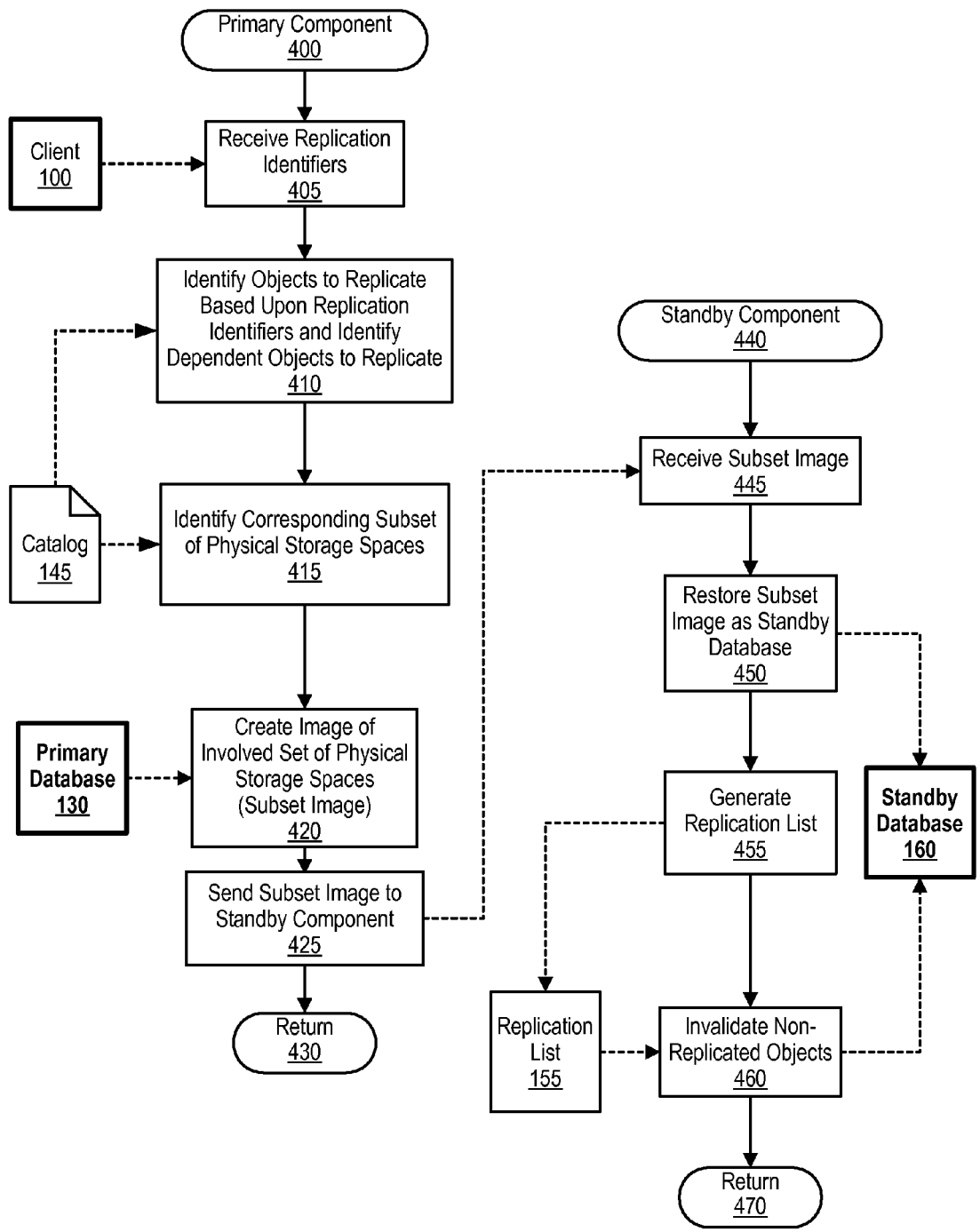
FIG. 4 is an exemplary flowchart showing steps that a primary component and standby component perform to generate a subset image and restore the subset image as a standby database that includes a replication of a subset of the primary database's physical storage spaces.

FIG. 4 is an exemplary flowchart showing steps that a primary component and standby component perform to generate a subset image and restore the subset image as a standby database that includes a replication of a subset of the primary database's physical storage spaces. The primary component's processing commences at 400, whereupon client 100 provides one or more replication identifiers to the primary component at step 405. The replication identifiers may include schema (e.g., "all finance tables") or particular table identifiers (e.g., T1, T2, T4, etc.) to include in a subset of physical storage spaces to replicate.

At step 410, the primary component identifies, using the replication identifiers, the database objects and dependent objects to replicate. Referring to FIG. 2A, the primary component identifies matching replication identifiers in columns 205-210 and identifies their corresponding table identifiers in column 200. To identify dependent objects to replicate, the primary component uses the corresponding table identifiers from column 200 and matches them with table identifiers in column 230 in order to identify corresponding dependent objects included in column 225.

Next, at step 415, the primary component utilizes catalog 145 to identify the subset of physical storage spaces that store the identified database objects and dependent objects. Referring to FIG. 2A, the primary component matches table identifiers in columns 200 and 230 with the tables to replicate and identifies corresponding physical storage spaces in columns 215 and 235.

At step 420, the primary component accesses primary database 130 and creates an image of the identified subset of physical storage spaces (e.g., storage space 1, 2, 4, etc.). In turn, the primary component sends the subset image to the standby component at step 425 and returns at 430.

The standby component's processing commences at 440, whereupon the standby component receives the subset image at step 445. The standby component restores the subset image as standby database 160, which includes a replication of the subset of physical storage spaces. At step 455, the standby component generates replication list 155, which is a list that identifies, in one embodiment, the replicated database objects, the replicated dependent objects, and the replicated subset of physical storage spaces. The standby component may generate replication list 155 using information in the subset image. In another embodiment, the primary component may provide replication list 155.

At step 460, the standby component invalidates unwanted objects from the subset of physical storage spaces using replication list 155. For example, one of the replicated subset of physical storage spaces may include partial objects, such as one partition of a non-replicated partitioned table, or a complete object such as an index of a non-replicated table. In this example, the standby component invalidates these objects in order to prevent access by workloads connecting to standby database 160. Standby component processing returns at 470.

Figure 5:
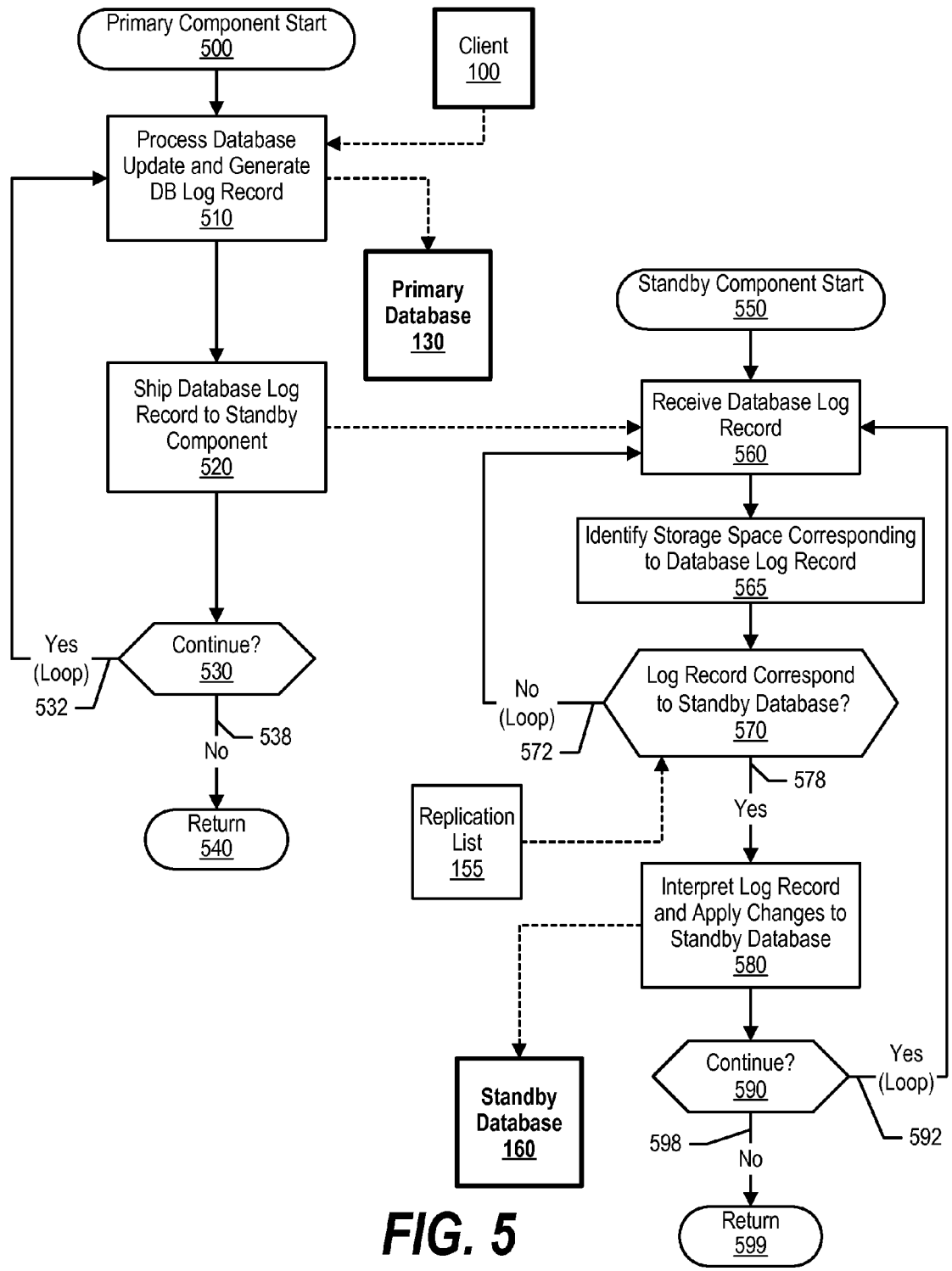
FIG. 5 is an exemplary flowchart showing steps that a primary component and standby component perform to generate database log records and apply the database log records to the replicated subset of physical storage spaces.

FIG. 5 is an exemplary flowchart showing steps that a primary component and standby component perform to generate database log records and apply the database log records to the replicated subset of physical storage spaces. The primary component's processing commences at 500, whereupon the primary component receives a database modification request from client 100 at step 510. The primary component processes the modification on primary database 130 and generates a database log record accordingly. At step 520, the primary component ships the database log record to the standby component. In one embodiment, the primary component ships each database log record to the standby component, regardless of whether the database log record pertains to the replicated subset of physical storage spaces that the standby component maintains. In this embodiment, the standby component determines which database log records are relevant to the replicated subset of physical storage spaces and replays only those relevant database log records.

In another embodiment, the primary component determines which database log records are relevant to the replicated subset of physical storage spaces, and ships the relevant database log records to the standby component. In this embodiment, the standby component may replay all database log records it receives from the primary database without having to filter the received database log records.

The primary component determines whether to continue processing database modification and shipping database log records (decision 530). If the primary component determines to continue, decision 530 branches to "Yes" branch 532, which loops back to receive database modifications and generate more database log records. On the other hand, if the primary component determines to terminate database updates (e.g., database failure, no more modifications to process, etc.), decision 530 branches to "No" branch 538, whereupon the primary component returns at 540.

The standby component's processing commences at 550, whereupon the standby component receives the database log record at step 560. At step 565, the standby component extracts a modified physical storage space identifier from the database log record and identifies the corresponding physical storage space that the primary component modified (see FIG. 2B and corresponding text for further details). The standby component determines whether the database log record applies to the standby database (replicated subset of physical storage spaces) that the standby component maintains, such as by checking the modified physical storage space identifier against replication list 155 (decision 570). If the database log record does not apply to the standby database, decision 570 branches to "No" branch 572, which loops back to receive additional database log records.

In one embodiment, the standby component may use two independent and parallel processes, one to receive the database log records and the other one to determine whether the database log records apply to the standby database. For example, one of the standby component's processes may receive the log records and place the log records into a queue. A second, independent process determines whether the database log records in the queue apply to the standby database.

On the other hand, if the database log record applies to the standby database, decision 570 branches to "Yes" branch 578, whereupon the standby component interprets the database log record and applies the changes to a replicated object in one of standby database 160's replicated physical storage spaces (step 580). Referring to the database log record shown in FIG. 2B, the standby component accesses "table 5" located in storage space "4," and changes, on the "27th page" at an offset of "19E," the value from "13A" to "35D."

The standby component determines whether to continue processing database log records (decision 590). If the standby component determines to continue, decision 590 branches to "Yes" branch 592, which loops back to receive and process more database log records. On the other hand, if the standby component determines to terminate database log record processing, decision 590 branches to "No" branch 598, whereupon the standby component returns at 599.

Figure 6:
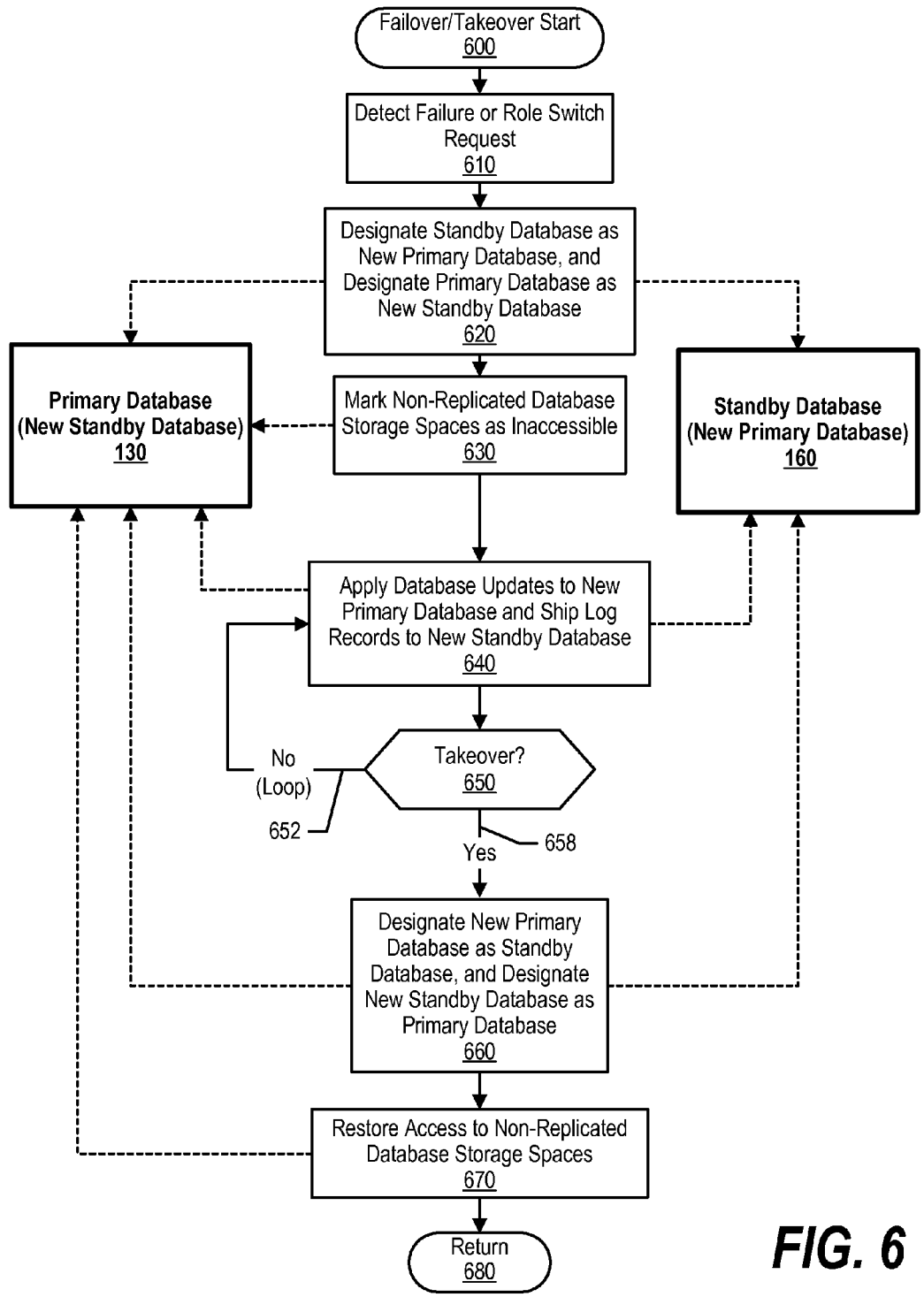
FIG. 6 is an exemplary flowchart showing steps that the primary component and standby component perform during a database failure or role switch.

FIG. 6 is an exemplary flowchart showing steps that the primary component and standby component perform during a database failure or role switch. Processing commences at 600, whereupon the primary component detects a database failure or receives a role switch request, such as from a database administrator (step 610). At step 620, the primary component designates primary database 130 as a new standby database, and the standby component designates standby database as the new primary database. As such, applications connected to new primary database 160 may access the replicated subset of physical storage spaces.

The primary component marks as "inaccessible," in new standby database 130, storage spaces that are not part of the subset of physical storage spaces in order to prevent standby applications from accessing non-replicated data (step 630). The standby component applies database updates to new primary database 160 and ships database log records to the primary component in order for the primary component to apply the database log records to new standby database 130 (step 640). The standby component and primary component determine whether a takeover occurs (decision 650). If a takeover does not occur (reverting databases back to their original roles), the standby component's and primary component's processing branches to "No" branch 652, which loops back to continue processing updates. On the other hand, on a subsequent takeover, the standby component's and primary component's processing branches to "Yes" branch 658 whereupon the original primary database resumes its primary role and the standby database resumes its standby role (step 660). At step 670, the primary component restores access to the non-replicated storage spaces in primary database 130, and processing returns at 680.

Figure 7:
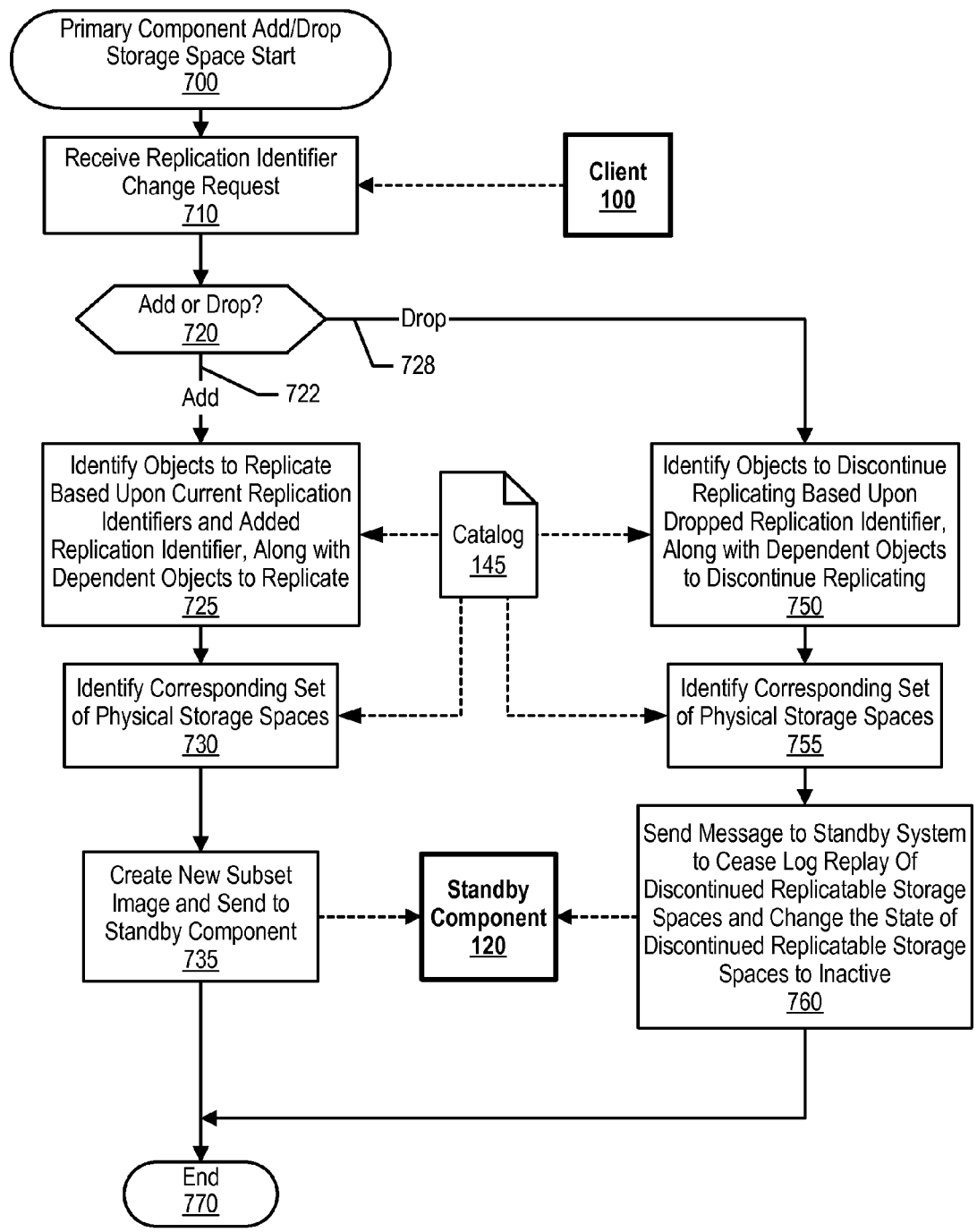
FIG. 7 is an exemplary flowchart showing steps that the primary component performs to instruct a standby component to add or drop storage spaces to/from the subset of physical storage spaces.

FIG. 7 is an exemplary flowchart showing steps that the primary component performs to instruct a standby component to add or drop storage spaces to/from the subset of physical storage spaces. The primary component's processing commences at 700, whereupon the primary component receives a replication identifier change request from client 100 at step 710, such as a request initiated by a database administrator. The primary component determines whether the request is a request to add a storage space or remove a storage space from the subset that is being replicated (decision 720). If the request is to add a storage space to replication subset, decision 720 branches to "Add" branch 722 whereupon the primary component accesses catalog 145 and identifies database objects and dependent objects to replicate based upon the existing replication identifiers and the replication identifier included in the change request (step 725).

Next, at step 730, the primary component identifies the storage spaces that correspond to the identified database objects and dependent objects to include in the subset of physical storage spaces. In turn, the primary component creates a new subset image at step 735 and sends the new subset image to standby component 120.

In one embodiment, the standby database may replicate all the storage spaces from the primary database, including the storage spaces that are not currently replicated. In this embodiment, when an administrator wishes to add a storage space to the replicated subset of physical storage spaces, the primary component may send a message to standby component 120 to start playing database log records at the time the replication starts on the newly replicated physical storage space.

Referring back to decision 720, if the request is to discontinue replicating a currently replicated storage space from the subset of physical storage spaces, decision 720 branches to "Drop" branch 728, whereupon the primary component access catalog 145 and identifies database objects and dependent objects that correspond to the replication identifier at step 750. Next, at step 755, the primary component identifies the replicated storage spaces that correspond to the discontinued database objects and discontinued dependent objects, referred to as discontinued replication physical storage spaces. In turn, the primary component sends a message to standby component 120 to stop replicating the discontinued replication physical storage spaces and change their status to inactive (step 760). Primary component add/drop processing ends at 770.

Figure 8:
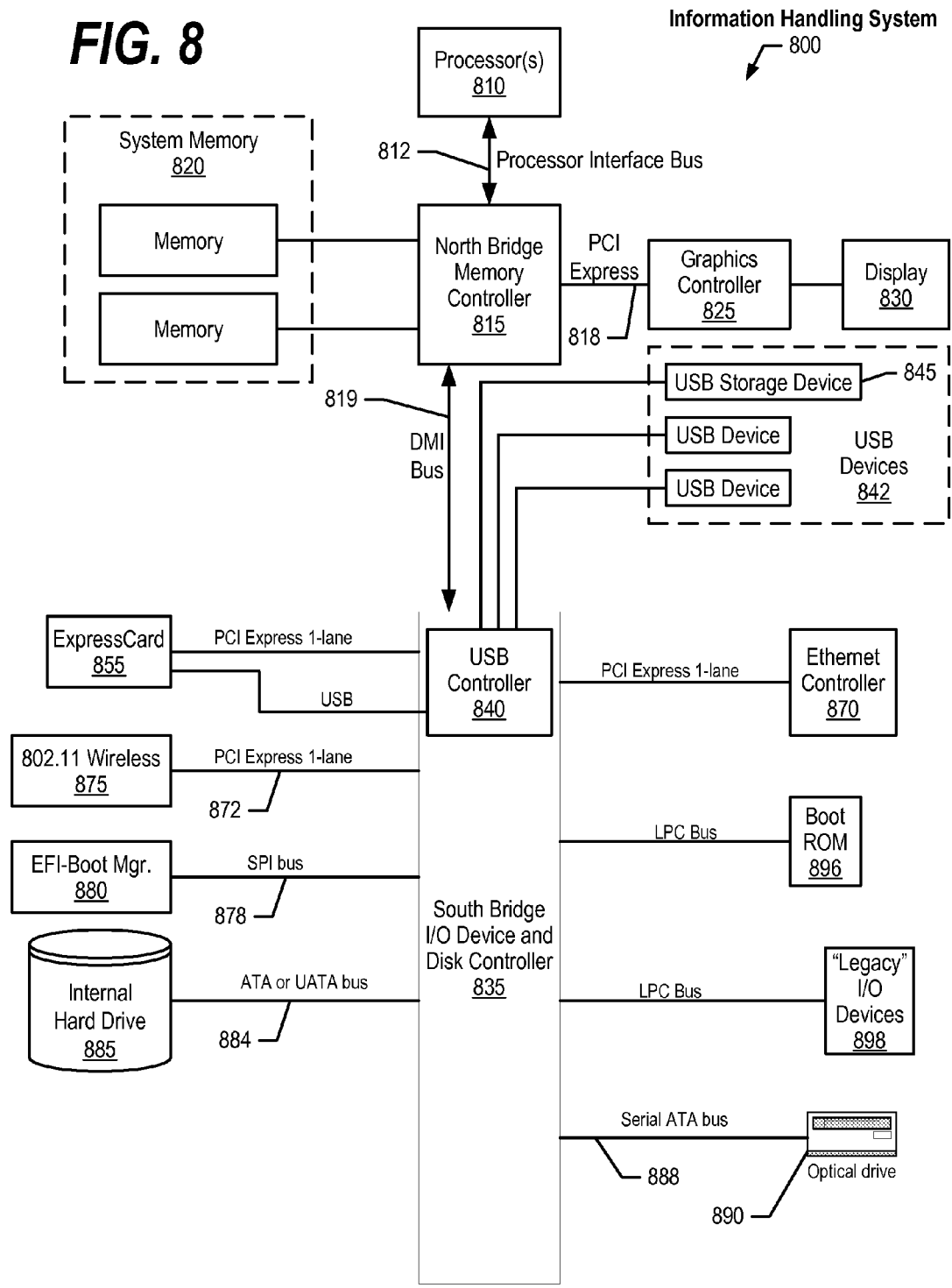
FIG. 8 is an exemplary block diagram of a data processing system in which the methods described herein can be implemented.

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 9:
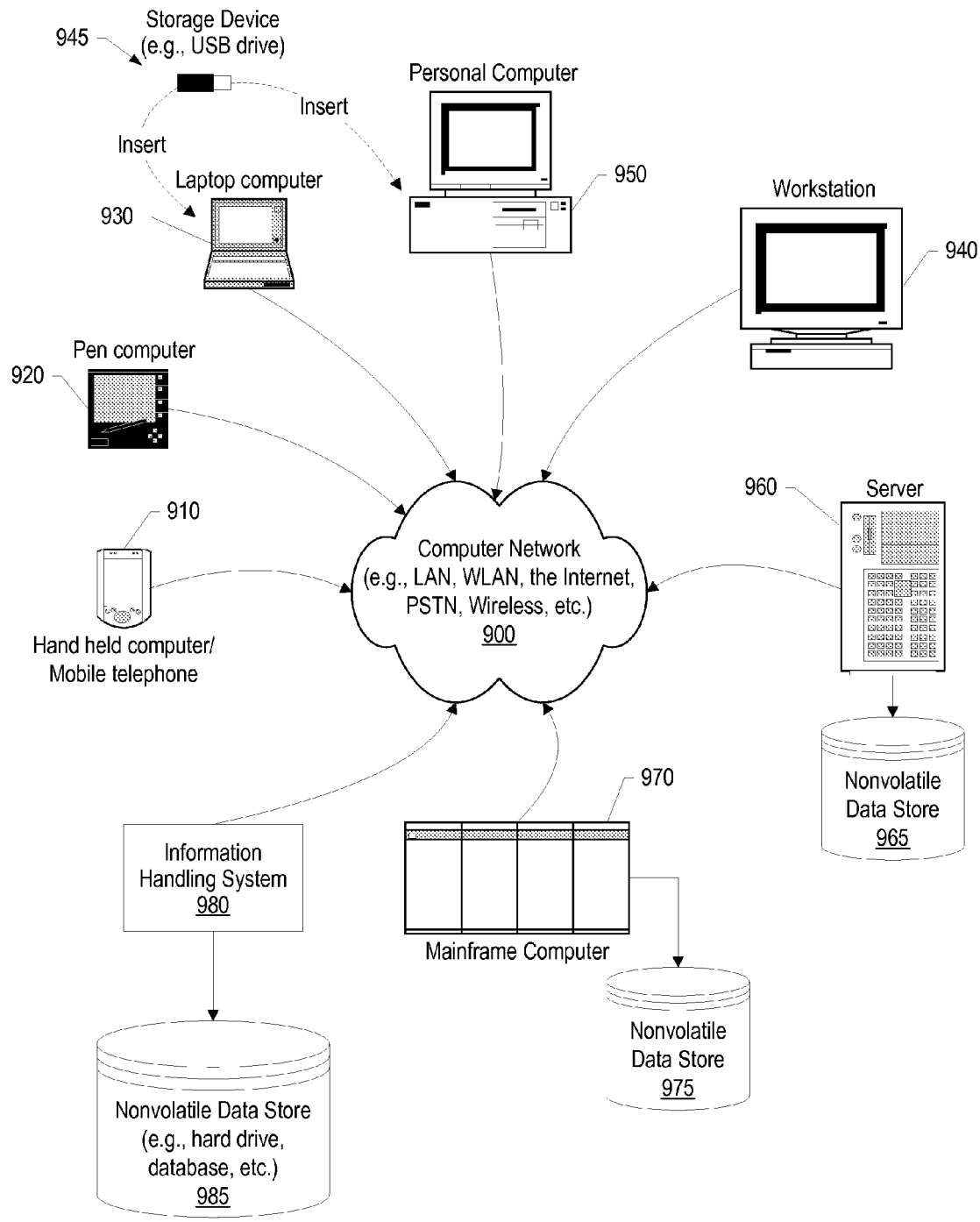
FIG. 9 provides an extension of the information handling system environment shown in FIG. 8 to illustrate that the methods described herein can be performed on a wide variety of information handling systems which operate in a networked environment.

FIG. 9 provides an extension of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method for replicating a subset of a plurality of physical storage spaces, the method comprising:
   receiving one or more replication identifiers at a primary component, wherein the primary component responsible for modifying a primary database;
   selecting, at the primary component, one or more database objects in the primary database to replicate that correspond to the one or more replication identifiers;
   selecting, at the primary component, one or more of a plurality of physical storage spaces corresponding to the one or more selected database objects;
   creating a subset image using the selected one or more physical storage spaces;
   sending the subset image from the primary component to a standby component that is responsible for modifying a standby database;
   restoring the subset image at the standby component, the restoring resulting in a replication of the selected one or more physical storage spaces stored in the standby database;
   receiving, at the standby component, a database log record corresponding to a modification to one of the selected one or more physical storage spaces, wherein the database log record corresponds to a modified object;
   determining, at the standby component, that the modified object corresponds to the standby database;
   invoking, at the standby component, a physical replay that replicates the modification on the standby database in response to the determination;
   receiving, at the primary component, a replication identifier change request that terminates replication of one or more of the selected database objects, resulting in one or more discontinued replication database objects;
   identifying, at the primary component, one or more of the selected plurality of physical storage spaces that correspond to the one or more discontinued replication database objects, resulting in one or more discontinued replication physical storage spaces; and
   sending a message, from the primary component to the standby component, to invalidate a portion of the standby database that corresponds to the one or more discontinued replication physical storage spaces.

2. The method of claim 1 further comprising:
   designating the primary database as a new standby database and designating the standby database as a new primary database; and
   marking as inaccessible one or more of the plurality of physical storage spaces on the new standby database that is not included in the selected one or more physical storage spaces.

3. The method of claim 1 wherein invoking the physical replay further comprises replaying the database log record, the replaying further comprising:
   extracting a modified bit location identifier from the database log record that corresponds to an address of one or more modified bits included in the modified object;
   selecting a replicated database object in the standby database that corresponds to the modified object; and
   modifying a portion of bits included in the replicated object at the address corresponding to the modified bit location identifier.

4. The method of claim 1 wherein the primary component performs the determination of whether the modified object corresponds a standby database, the method further comprising:
   sending the database log record from the primary component to the standby component in response to determining that the modified object corresponds the standby database.

5. An information handling system comprising:
   one or more processors;
   a memory coupled to at least one of the processors;
   a set of computer program instructions stored in the memory and executed by at least one of the processors in order to perform actions of:
      receiving one or more replication identifiers at a primary component, wherein the primary component responsible for modifying a primary database;
      selecting, at the primary component, one or more database objects in the primary database to replicate that correspond to the one or more replication identifiers;
      selecting, at the primary component, one or more of a plurality of physical storage spaces corresponding to the one or more selected database objects;
      creating a subset image using the selected one or more physical storage spaces;
      sending the subset image from the primary component to a standby component that is responsible for modifying a standby database;
      restoring the subset image at the standby component, the restoring resulting in a replication of the selected one or more physical storage spaces stored in the standby database;
      receiving, at the standby component, a database log record corresponding to a modification to one of the selected one or more physical storage spaces, wherein the database log record corresponds to a modified object;
      determining, at the standby component, that the modified object corresponds to the standby database;
      invoking, at the standby component, a physical replay that replicates the modification on the standby database in response to the determination;
      receiving, at the primary component, a replication identifier change request that terminates replication of one or more of the selected database objects, resulting in one or more discontinued replication database objects;
      identifying, at the primary component, one or more of the selected plurality of physical storage spaces that correspond to the one or more discontinued replication database objects, resulting in one or more discontinued replication physical storage spaces; and
      sending a message, from the primary component to the standby component, to invalidate a portion of the standby database that corresponds to the one or more discontinued replication physical storage spaces.

6. The information handling system of claim 5 wherein the processors perform additional actions comprising:
   designating the primary database as a new standby database and designating the standby database as a new primary database; and
   marking as inaccessible one or more of the plurality of physical storage spaces on the new standby database that is not included in the selected one or more physical storage spaces.

7. The information handling system of claim 5 wherein invoking the physical replay further comprises replaying the database log record, and wherein the processors perform additional actions comprising:
   extracting a modified bit location identifier from the database log record that corresponds to an address of one or more modified bits included in the modified object;
   selecting a replicated object in the standby database that corresponds to the modified object; and
   modifying a portion of bits included in the replicated object at the address corresponding to the modified bit location identifier.

8. The information handling system of claim 5 wherein the primary component performs the determination of whether the modified object corresponds a standby database, and wherein the processors perform additional actions comprising:
   sending the database log record from the primary component to the standby component in response to determining that the modified object corresponds the standby database.

9. A computer program product stored in a computer readable storage medium, comprising computer program code that, when executed by an information handling system, causes the information handling system to perform actions comprising
   receiving one or more replication identifiers at a primary component, wherein the primary component responsible for modifying a primary database;
   selecting, at the primary component, one or more database objects in the primary database to replicate that correspond to the one or more replication identifiers;
   selecting, at the primary component, one or more of a plurality of physical storage spaces corresponding to the one or more selected database objects;
   creating a subset image using the selected one or more physical storage spaces;
   sending the subset image from the primary component to a standby component that is responsible for modifying a standby database;
   restoring the subset image at the standby component, the restoring resulting in a replication of the selected one or more physical storage spaces stored in the standby database;
   receiving, at the standby component, a database log record corresponding to a modification to one of the selected one or more physical storage spaces, wherein the database log record corresponds to a modified object;

determining, at the standby component, that the modified object corresponds to the standby database;

invoking, at the standby component, a physical replay that replicates the modification on the standby database in response to the determination;

receiving, at the primary component, a replication identifier change request that terminates replication of one or more of the selected database objects, resulting in one or more discontinued replication database objects;

identifying, at the primary component, one or more of the selected plurality of physical storage spaces that correspond to the one or more discontinued replication database objects, resulting in one or more discontinued replication physical storage spaces; and sending a message, from the primary component to the standby component, to invalidate a portion of the standby database that corresponds to the one or more discontinued replication physical storage spaces.

10. The computer program product of claim 9 wherein the information handling system performs additional actions comprising:

designating the primary database as a new standby database and designating the standby database as a new primary database; and marking as inaccessible one or more of the plurality of physical storage spaces on the new standby database that is not included in the selected one or more physical storage spaces.

11. The computer program product of claim 9 wherein invoking the physical replay further comprises replaying the database log record, and wherein the information handling system performs additional actions comprising:

extracting a modified bit location identifier from the database log record that corresponds to an address of one or more modified bits included in the modified object;

selecting a replicated object in the standby database that corresponds to the modified object; and modifying a portion of bits included in the replicated object at the address corresponding to the modified bit location identifier.

12. The computer program product of claim 9 wherein the primary component performs the determination of whether the modified object corresponds a standby database, and wherein the information handling system performs additional actions comprising:

sending the database log record from the primary component to the standby component in response to determining that the modified object corresponds the standby database.

13. A method for replicating a subset of a plurality of physical storage spaces, the method comprising:

receiving one or more replication identifiers at a primary component, wherein the primary component responsible for modifying a primary database;

selecting, at the primary component, one or more database objects in the primary database to replicate that correspond to the one or more replication identifiers;

selecting, at the primary component, one or more of a plurality of physical storage spaces corresponding to the one or more selected database objects;

creating a subset image using the selected one or more physical storage spaces;

sending the subset image from the primary component to a standby component that is responsible for modifying a standby database;

restoring the subset image at the standby component, the restoring resulting in a replication of the selected one or more physical storage spaces stored in the standby database;

receiving, at the standby component, a database log record corresponding to a modification to one of the selected one or more physical storage spaces, wherein the database log record identifies one or more modified bits included in a modified object;

determining, at the standby component, that the modified object corresponds to the standby database;

invoking a physical replay that replicates the modification on the standby database in response to the determination; and, the physical replay further comprising:

extracting a modified bit location identifier from the database log record that corresponds to an address of the one or more modified bits;

selecting a replicated object in the standby database that corresponds to the modified object; and modifying a portion of bits included in the replicated object at the address corresponding to the modified bit location identifier;

receiving, at the primary component, a replication identifier change request that terminates replication of one or more of the selected database objects, resulting in one or more discontinued replication database objects;

identifying, at the primary component, one or more of the selected plurality of physical storage spaces that correspond to the one or more discontinued replication database objects, resulting in one or more discontinued replication physical storage spaces; and sending a message, from the primary component to the standby component, to invalidate a portion of the standby database that corresponds to the one or more discontinued replication physical storage spaces.

* * * * *